UNITED STATES PATENT OFFICE.

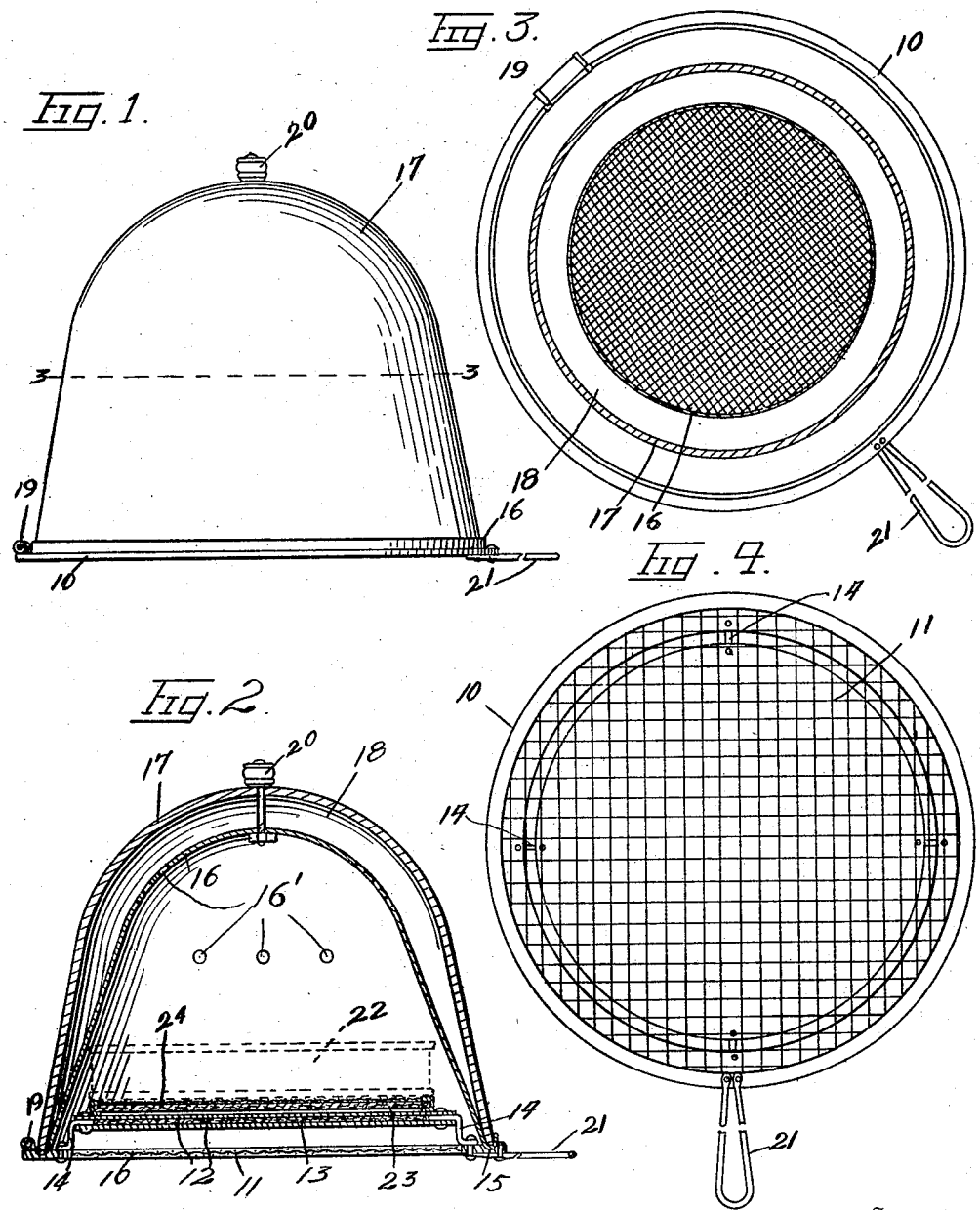

CONRAD C. GROSS, OF PASADENA, CALIFORNIA.

FOOD-BAKING DEVICE.

1,271,309.  Specification of Letters Patent.  Patented July 2, 1918.

Application filed January 15, 1917. Serial No. 142,450.

*To all whom it may concern:*

Be it known that I, CONRAD C. GROSS, a citizen of the United States, residing at Pasadena, in the county of Los Angeles, State of California, have invented certain new and useful Improvements in Food-Baking Devices; and I do hereby declare the following to be a full, clear, and exact description of the invention, such as will enable others skilled in the art to which it appertains to make and use the same.

This invention relates to improvements in food baking devices, and particularly to devices of this character which are used on gas or oil stoves.

One object of the present invention is to provide a simple and cheap device of this character wherein foods can be more quickly and efficiently baked than in the oven of the range.

Another object of the present invention is to provide a simple device which can be placed on a single burner of a gas or oil stove to bake foods without the great heat which usually issues from the ovens of gas or oil ranges, and with the expenditure of less gas or oil.

Other objects and advantages will be apparent from the following description when taken in connection with the accompanying drawing.

In the drawings:

Figure 1 is an elevation of my improved baking device.

Fig. 2 is a vertical sectional view through the device.

Fig. 3 is a horizontal sectional view taken on the line 3—3 of Fig. 1.

Fig. 4 is a bottom plan view of the device.

Referring particularly to the accompanying drawing, 10 represents a flat metal ring to which is secured, and which covers the opening therein, a coarse wire mesh disk 11. Disposed in spaced relation above the wire disk is a disk formed of two superimposed sheets of metal, 12, between which is disposed a sheet of asbestos 13. Carried by the disk are a plurality of feet 14, the lower ends of which are suitably secured to the ring 10, said feet thus spacing the disk above the wire. In the upper face of the ring there is formed a circular groove 15, the purpose of which will appear later.

A dome formed of an inner member 16 and an outer member 17, spaced therefrom to provide an air space 18 therebetween, is connected to the outer edge of the ring 10 by means of the hinge 19, thus permitting the said dome to be swung from over the metal disk, for the purpose of placing on or removing from the disk, the vessel which contains the food to be baked. A suitable handle 20 is carried by the top of the dome whereby the same can be conveniently handled when hot. A handle 21 is fixed to the edge of the ring 10, so that the entire device can be lifted from or on to the stove.

The device is of such size and proportions that it may be conveniently placed over a single burner of a gas or oil range. The bake pan 22 is placed on the metal disk and the dome brought down until its lower edge rests in the groove of the ring. The baking will then proceed, as will be understood.

When it is desired to bake potatoes, an asbestos mat 23, having a wire screen 24 associated therewith and forming a part thereof, is placed on the metal disk, and the potatoes placed on the said wire screen 24.

It will thus be seen that I have provided a simple and cheap device by means of which foods can be quickly and conveniently baked without the necessity of the use of the oven of the range, and thereby obviating the usual and uncomfortable heating of the kitchen. Also, the use of a single burner, on the top of the range, permits the cook to bake foods with the expenditure of a considerably smaller quantity of gas, than the oven would consume, and with the radiating of less heat. Furthermore the device is capable of being moved from one burner to another, as desired, and can be quickly and conveniently moved onto or off the range. In the sides and top portions of the inner dome member 16 there are formed moisture escape openings 16′.

What is claimed is:

A food baking device including a base consisting of a reticulated disk and a surrounding ring connected thereto and having a groove in the upper face thereof, a metal disk spaced above the reticulated disk, feet connected to said metal disk and to the said ring, and a double-walled dome hinged to the ring and provided with a handle, the lower edge of the inner wall of the dome being turned upwardly and seated in said groove, the lower edge of the outer wall of the dome being seated within the said upturned edge of the inner wall.

In testimony whereof, I affix my signature, in the presence of two witnesses.

CONRAD C. GROSS.

Witnesses:
 HARRY L. BURNEY,
 ARTHUR P. ABBOTT.

Copies of this patent may be obtained for five cents each, by addressing the "Commissioner of Patents, Washington, D. C."